United States Patent [19]
Fithian et al.

[11] Patent Number: 4,657,938
[45] Date of Patent: Apr. 14, 1987

[54] SPRAYABLE AND FOAMABLE INSULATING COMPOSITION

[75] Inventors: Luke E. Fithian, Cheshire; Frank C. Cesare, Woodbury, both of Conn.

[73] Assignee: Uniroyal Chemical Company, Inc., Middlebury, Conn.

[21] Appl. No.: 769,814

[22] Filed: Aug. 26, 1985

[51] Int. Cl.$^4$ .............................................. C08J 9/30
[52] U.S. Cl. ........................................ 521/96; 521/78; 521/79; 521/144; 521/149; 521/150
[58] Field of Search ..................... 521/78, 79, 144, 96, 521/149, 150

[56] References Cited

U.S. PATENT DOCUMENTS

| | | | |
|---|---|---|---|
| 3,261,818 | 7/1966 | Marcantonio | 260/85.1 |
| 3,819,592 | 6/1974 | Visser et al. | 260/80.78 |
| 3,903,063 | 9/1975 | Perkins | 260/80.78 |
| 3,912,665 | 10/1975 | Spitzer et al. | 521/78 |
| 3,960,583 | 6/1976 | Netting et al. | 521/78 |
| 4,328,319 | 5/1982 | Osipow et al. | 521/78 |
| 4,422,877 | 12/1983 | Spitzer et al. | 521/78 |
| 4,423,161 | 12/1983 | Cobbs, Jr. et al. | 521/78 |
| 4,525,487 | 6/1985 | Ahnemiller et al. | 521/78 |

OTHER PUBLICATIONS

Kalox TM Sales Material, Hardman Chemical Co.

Primary Examiner—Morton Foelak
Attorney, Agent, or Firm—William E. Dickheiser

[57] ABSTRACT

A sprayable and foamable insulating composition comprising: (A) at least one low molecular weight polymer selected from the group consisting of ethylene/alphaolefin copolymer, ethylene/alphaolefin/nonconjugated polyene terpolymer, polyacrylate, polymethacrylate, polyisoprene, polyacrylonitrile, polymethacrylonitrile and polybutadiene; (B) an effective amount of curative; and (C) an effective amount of a blowing agent having an activation temperature which is less than or about equal to the curing temperature of component (B), said composition having a Brookfield viscosity of about 100,000 centipoise or less at shear rates of 5 sec$^{-1}$ or greater. A process for providing a layer of insulating foam employing such composition is also disclosed.

9 Claims, No Drawings

SPRAYABLE AND FOAMABLE INSULATING COMPOSITION

FIELD OF THE INVENTION

This invention relates to a sprayable and foamable insulating composition comprising: (A) at least one low molecular weight polymer selected from the group consisting of ethylene/alphaolefin copolymer, ethylene/alphaolefin/nonconjugated polyene terpolymer, polyacrylate, polymethacrylate, polyisoprene, polyacrylonitrile, polymethacrylonitrile and polybutadiene: (B) an effective amount of curative; and (C) an effective amount of a blowing agent having an activation temperature which is less than or about equal to the curing temperature of component (B). In another aspect, this invention relates to a method for providing a layer of insulating foam employing such a foamable and sprayable composition.

BACKGROUND OF THE INVENTION

The use of foamed materials for thermal and sonic insulation has long been recognized in the construction and automotive fields. In the past, such foamed insulation materials have generally been preformed, sized into appropriate shape, and inserted into the volume to be insulated.

A drawback with such preformed foamed materials is the difficulty of inserting such materials into irregularly-shaped volumes. Such insertion requires costly and time-consuming shaping steps. Additionally, such insertion greatly restricts the assembly process as the foam may be inserted into the desired volume only while such volume is substantially completely exposed. Moreover, such manual means of application is relatively slow and is, therefore, commercially undesirable.

A problem also encountered in the past with foamed compositions is that such compositions generally exhibit poor adhesion to the surfaces to which they are to be applied. Consequently, such prior art compositions generally require the use of adhesives to bond them into place, thereby necessitating additional expense as well as additional processing steps.

Therefore, it would be desirable to possess a foamable composition which could be more easily formed into irregular shapes and/or which could be more easily applied onto a substrate surface. Moreover, it would be desirable to possess a foamable and curable composition which, when foamed and cured, would exhibit enhanced adhesion to substrates.

Accordingly, it is an object of this invention to provide a sprayable and foamable insulating composition which is easily adapted to irregular volumes.

It is a further object of this invention to provide a method for applying a foamed insulating composition to a substrate, which method allows for increased freedom and/or speed in the assembly process.

It is yet another object to provide a sprayable and foamable composition which will exhibit enhanced adhesion to substrate surfaces upon foaming and curing.

The above and additional objects will become more fully apparent from the following description and Example.

DESCRIPTION OF THE INVENTION

In one aspect, this invention relates to a sprayable and foamable composition comprising:

(A) at least one polymer selected from the group consisting of ethylene/alphaolefin copolymer, ethylene/alphaolefin/nonconjugated polyene terpolymer, polyacrylate, polymethacrylate, polyisoprene, polyacrylonitrile, polymethacrylonitrile and polybutadiene, said polymer having a number average molecular weight of between about 500 and about 15,000;

(B) an effective amount of curative; and (C) an effective amount of blowing agent having an activation temperature which is less than or about equal to the curing temperature of curative component (B):

said composition having a Brookfield viscosity of less than about 100,000 centipoise at shear rates of 5 sec$^{-1}$ or greater.

In another aspect, this invention relates to a method for coating a substrate with a layer of foamed insulation said method comprising the steps:

(A) spraying onto said substrate a curable and foamable composition comprising:

(i) at least one polymer selected from the group consisting of ethylene/alphaolefin copolymer, ethylene/alphaolefin/nonconjugated polyene terpolymer, polyacrylate, polymethacrylate, polyisoprene, polyacrylonitrile, polymethacrylonitrile and polybutadiene, said polymer having a number average molecular weight of between about 500 and about 15,000;

(ii) an effective amount of curative: and (iii) an effective amount of blowing agent having an activation temperature which is less than or about equal to the curing temperature of component (ii);

said composition having a Brookfield viscosity of less than about 100,000 centipoise at shear rates of 5 sec$^{-1}$ or greater; and (B) subjecting said composition to foaming and curing conditions.

The low molecular weight polymer of the composition of this invention comprises at least one member selected from the group consisting of ethylene/alphaolefin copolymer, ethylene/alphaolefin/nonconjugated polyene terpolymer, polyacrylate, polymethacrylate, polyisoprene, polyacrylonitrile, polymethacrylonitrile and polybutadiene.

The polyacrylate, polymethacrylate, polyisoprene, polyacrylonitrile, polymethacrylonitrile and polybutadiene polymers employed in the process of this invention may be homopolymers of these monomers or copolymers additionally comprising a minor amount of another monomer or monomers having vinyl unsaturation. Moreover, these polymers may be unhydrogenated, partially hydrogenated or fully hydrogenated. The polyacrylate and polymethacrylate polymers which may be employed in the process of this invention are polymers comprised of a major amount of monomers of the formulae $H_2C=CH-COOR^1$ and $H_2C=C(CH_3)-COOR^1$, respectively, wherein $R^1$ is an alkyl radical comprising 1 to 4 carbon atoms.

Preferred polymers include ethylene/alphaolefin copolymers and ethylene/alphaolefin/nonconjugated polyene terpolymers.

The ethylene/alphaolefin copolymers which may be employed in the practice of this invention are copolymers of ethylene and at least one alphaolefin having the formula $H_2C=CHR$ wherein R is a linear or branched alkyl radial containing from 1 to 10 carbon atoms. Preferably, R is $C_1$–$C_8$ alkyl. The most preferred alphaolefins are propylene, 1-butene and 1-pentene. In one preferred embodiment, the ethylene/alphaolefin copolymers further comprise alkyl- and/or aryl- substituted norbornene.

The ethylene/alphaolefin/nonconjugated polyene terpolymers which may be employed are polymers of ethylene, at least one alphaolefin (of the formula $H_2C$=CHR, wherein R is a linear or branched alkyl radical comprised of from 1 to 10 carbon atoms) and at least one copolymerizable nonconjugated polyene. Illustrative of the nonconjugated polyenes which may be employed are aliphatic dienes such as 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, exo- and endo-dicyclopentadiene and the like; exo- and endo-alkenylnorbornenes, such as 5-propenyl-, 5-(buten-2-yl)-, and 5-(2-methylbuten-[2']-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like. The preferred nonconjugated polyenes are 5-ethylidene-2-norbornene, 1,4-hexadiene and dicyclopentadiene.

The ethylene content of the ethylene/alphaolefin copolymers and ethylene/alphaolefin/nonconjugated polyene terpolymers that may be employed is generally between about 25% and about 85%, is preferably between about 30% and about 75%, and is most preferably between about 40% and about 70% all by weight. The polyene content of such terpolymers is generally below about 25%, and is preferably between about 2 and about 20% all by weight.

In addition, the low molecular weight polymers employed in this invention may have incorporated therein and/or at the terminals thereof functional groups such as halogen, sulfo, sulfino, sulfinyl, cyano, epoxy, hydroxy, carboxy, COOR, $Si(OR)_3$, $Si(OOCR)_3$ (R being a hydrocarbyl radical having 1–18 carbon atoms) and the like. Such functional groups may be introduced either by replacement, addition or graft polymerization reactions well known to those skilled in the polymerization art.

The polymers employed in the composition of this invention are liquids at ambient temperatures, which are between about 20° and about 40° C. The term "liquid" is employed in conventional terms, that is that it will have a definite volume, but will assume the shape of its container. More specifically, it will be amenable to liquid handling techniques, including being pumped and sprayed onto a substrate surface. Such liquid polymers will possess a number average molecular weight of from about 500 to about 15,000, with a preferred range of between about 1,000 and about 10,000, and a most preferred range of between about 4,000 and about 7,000.

As is employed herein, the term "curative" encompasses both curatives and curing systems. As is well known to those skilled in the art, the particular curatives which may be employed in a given composition is generally governed by the availability of unsaturation and/or functional groups present in the the low molecular weight polymers to be cured. A wide variety of curatives and curing systems may be employed where applicable, such as free radical generating agents such as aromatic and aliphatic peroxides, including, for example, aromatic diacyl peroxides and aliphatic diacyl peroxides, dibasic acid peroxides, ketone peroxides, alkyl peroxyesters and alkyl hydroperoxides. Specific nonlimiting examples of useful peroxides and hydroperoxides include diacetylperoxide, dibenzoylperoxides; bis-2,4-dichloro benzoyl peroxide; ditert.-butyl peroxide; dicumylperoxide; tert.-butylperbenzoate; tert.-butylcumyl peroxide; 2,5-bis-(tert.-butylperoxy)-2,5-dimethylhexane; 2,5-bis-(tert.-butylperoxy)-2,5-dimethylhexyne-3; 4,4,4', 4'-tetra-(tert.-butylperoxy)-2,2-dicyclohexylpropane; 1,4-bis-(tert.-butylperoxy-isopropyl)-benzene; 1,1-bis-(tert.-butylperoxy) -3,3,5-trimethylcyclohexane; lauroyl peroxide; succinic acid peroxide, cyclohexanone peroxide; tert.-butyl peracetate and butyl hydroperoxide.

Also suitable in applicable cases are the azide curing agents including azidoformates, such as tetramethylenebis(azido-formate) and the like; aromatic polyazides, such as 4,4'-diphenylmethane diazide and the like; and sulfonazides such as p,p'-oxybis(benzene sulfonyl azide) and the like. Other curatives that may be used include the aldehydeamine reaction products such as formaldehyde-ammonia, formaldehyde-ethylchlorideammonia, acetaldehyde-ammonia, formaldehyde-aniline, butyraldehyde-aniline, heptaldehyde-aniline, heptaldehyde-formaldhyde-aniline, hexamethylenetetramine, alphaethyl-beta propylacrolein-aniline and the like; substituted ureas, such as trimethylthiourea, diethylthiourea, dibutylthiourea, tripentylthiourea, 1,3-bis(benzothiazolyl-mercaptomethyl) urea, N,N-dephenylthiourea and the like; guanidines, such as diphenylguanidine, di-o-tolylguanidine, diphenylguanidine phthalate, the di-o-tolylguanidine salt of dicatechol borate and the like; xanthates, such as zinc ethylxanthate, sodium isopropylxanthate, butylxanthic disulfide, potassium isopropylxanthate, and zinc butylxanthate and the like; dithiocarbamates, such as copper dimethyl-, zinc dimethyl-, tellurium diethyl-, cadmium dicyclohexyl-, lead dimethyl-, selenium dibutyl-, zinc pentamethylene-, zinc didecyl-, zinc isopropyloctyldithiocarbamate and the like; thiazoles, such as 2-mercaptobenzothiazole, zinc mercaptothiazolyl mercaptide, 2-benzothiazoly-N,N-diethylthiocarbamyl sulfide, 2,2'-dithiobis(benzothiazole) and the like; imidazoles, such as 2-mercaptoimidazoline, 2-mercapto-4,4,6-trimethyl-dihydropyrimidine) and the like; sulfenamides such as N-t-butyl-2-benzothiazole-, N-cyclohexylbenzothiazole-, N,N-diisopropyl-benzothiazole-, N-(2,6-dimethylmorpholino)-2-benzo-thiazole-sulfenamide and the like; thiuramdisulfides, such as N,N'-diethyl-, tetrabutyl-, N,N'-diisopropyldioctyl-, tetramethyl-, N,N'-dicyclohexyl-, N,N'-tetralaurylthiuramidsulfide and the like; paraquinonedioxime, dibenzoparaquinonedioxime and the like: and sulfur itself. (See Encyclopedia of Chemical Technology, vol. 17, 2nd edition, Interscience Publishers, 1968; also Organic Peroxides, Daniel Swern, vol. 1, Wiley-Interscience, (1970).

When a peroxide curative is employed, such curative may be used alone or with auxiliary substances such as sulfur; maleimides, including bis-maleimides; polyunsaturated compounds, such as cyanurate and the like; acrylic esters, such as trimethylolpropane trimethacrylate and the like; organic transition metal salts, such as cobalt octoate, cobalt naphthenate, copper stearate, chromium laurate and the like; and tertiary amines, such as tributylamine, and dimethyloctylamine and the like.

When using sulfur as a curative (whether in its elemental form or in the form of a sulfur donor), it is desirable to include an accelerator and an activator (e.g., a metal salt or oxide).

Mixed peroxide-type or mixed-sulfur-type curing systems may be employed. These include dicumylperoxide plus 2,5-bis-(tert.-butylperoxy)-2,5-dimethylhexane or sulfur plus tetramethylthiuramidisulfide plus dicumyl peroxide. See "Vulcanization and Vulcanizing Agents," W. Hoffman, Palmerton Publishing Co., N.Y., 1967, for an extensive disclosure of curing agents.

The curatives of the composition of this invention are present in an amount effective to cure the polymer of such composition. Typically, such curatives will be present in amounts of between about 0.5 and about 5 parts by weight per 100 parts of polymer.

Blowing agents suitable for use in the practice of this invention include inert compounds which readily turn from a liquid to a gaseous state upon heating to curing temperature range such as optionally halogenated (particularly fluorinated) hydrocarbons including pentane, hexane, octane; or solid chemical blowing agents which upon heating decompose thereby releasing gases such as $CO_2$, $N_2$ and the like. The latter blowing agents include sodium bicarbonate, azodicarbonamide, benzenesulfonyl hydrazide, toluenesulfonyl hydrazide, dinitrosopentamethylenetetramine, oxybis(p-benzenesulfonyl hydrazide) alone or in combination with activating agents therefore such as zinc oxide, metal salts of sulfuric acids such as zinc bis(toluenesulfuric acid, potassium dodecane-sulfinic acid, activated urea, stearic acid, poly(ethylene ether)glycol and others. Such blowing agent is preferably present in amounts of between about 0.1 and about 10 parts by weight per 100 parts by weight of polymer.

It is important to choose a blowing agent or blowing agent system whose gasification or decomposition temperature or temperature range is below that of or at least approximately equal to the activation temperature or temperature range of the curing agent(s) or curing system, thereby ensuring that excessive premature curing does not occur.

If so desired, a processing aid may be added to the composition. Illustrative of suitable processing aids are low molecular weight amorphous polypropylene, polybutene, bitumen or processing or extender oils such as naphthenic or paraffinic oils; also waxes such as microcrystalline paraffinic wax.

Other ingredients which may be added to the instant compositions include antioxidants, antiozonants, ultraviolet light stabilizers, tackifiers, pigments, colorants, fire retardants, surfactants and the like.

It is often advantageous to include fillers and/or reinforcing agents in the composition of this invention, such as carbon black, clay, pumice, talc, calcium carbonate, silica, silicates, barytes and metal oxides such as $TiO_2$. However, the amount of such fillers and/or additives employed should not be so high as to increase the viscosity of the composition as to render it unsprayable.

The composition of this invention possesses a Brookfield viscosity of less than about 100,000 centipoise, preferably of less than about 75,000 centipoise, and most preferably of less than about 50,000 centipoise at shear rates of 5 $sec^{-1}$ or greater.

It is preferred that thorough dispersion of the components of this invention be achieved. However, because the compositions employed in the practice of this invention are generally viscous, high shear mixing may be necessary. This high shear mixing may be accomplished employing suitable mixers, such as homogenizers, dispersers and sigma blade mixers. Mixing may be done at room temperature or elevated (e.g., 30°–175° C.) temperature so long as such temperature is below the foaming and curing temperature of the composition.

Preferably, all the ingredients except the blowing agent are first blended together until an essentially homogeneous composition is obtained, it being understood that the mixing temperature not reach the activation temperature of the curative. Thereafter, the blowing agent may be blended in while taking care that the mixing temperature remains well under the decomposition or gasification temperature of the blowing agent.

For adjusting the viscosity of the composition such that it is more readily sprayable, usually after the other components have been added, minor amounts of solvent may be employed. Preferably, the compositions of this invention comprise at least about 40 percent, more preferably at least about 50 percent, and most preferably at least about 65 percent solids by weight. Any compatible solvent may be used, the most common being aliphatic and aromatic hydrocarbons such as hexane, naphtha, toluene and xylene.

The method of this invention is typically performed as follows. The composition of this invention is sprayed onto the substrate to be insulated. The composition may be sprayed by the conventional techniques, i.e., either by compressed air, or by airless spray, which involves pumping it at high pressure (ca. 1,000 to 6,000 psi) through a fine nozzle. Because the low molecular weight polymers employed in this invention are inherently shear sensitive, i.e., possessing low viscosity at high shear rates such as are encountered in a spray nozzle and high viscosity at low or no shear such as are encountered when the spray is deposited upon its substrate, they are especially suited for spray application.

The composition is then foamed and cured by exposing it to appropriate conditions, typically increased temperature.

The compositions of this invention may be sprayed onto any suitable substrate which can withstand curing temperatures and to which they can sufficiently adhere. Illustrative of such substrates are metals, such as aluminum, steel or chrome; carbon fibers; high softening point thermoplastics; and thermoset materials which maintain their dimensional integrity at curing temperatures. Upon curing, the sprayable compositions of this invention exhibit an unexpected degrees of adherence to such substrates.

The compositions of this invention provide a versatility of application where sonic and/or thermal insulation is desired. Specific applications envisioned include rust proofing of car doors, trunk lid seals, undercoating, noise reducing layers on the underside of car hoods or trunk lids. For the above and similar automotive applications, the compositions of this invention are especially suitable because foaming and curing may be achieved while simultaneously heat treating car body paint.

EXAMPLE

The following Example is provided to further illustrate the invention and is not intended to limit the scope of the invention in any manner.

A sprayable, foamable composition is prepared by blending the following ingredients employing a high speed sigma blade mixer:

| Component | Parts by Weight |
| --- | --- |
| EPDM* | 100 |
| N330 Carbon Black | 25 |
| Nirez 1040 ™ ** | 15 |
| Zinc Oxide | 5 |
| Stearic Acid | 2 |
| Azodicarbonamide | 6 |
| 2-mercaptobenzthiazole | 1.5 |
| Tellurium Diethyldithiocarbamate | 1 |
| Dipentamethylenethiuram hexasulfide | 1.5 |
| Zinc Dimethyldithiocarbamate | 1 |
| Sulfur | 2.6 |
| Xylene | 40 |

*EPDM having a number average molecular weight of 6600, an iodine number of 19, and having an ethylene/propylene weight ratio of 49:51.
**Nirez 1040 ™ : a tackifier comprised of terpene polymers.

The mixture is sprayed onto an aluminum substrate at about 6000 psi through a 0.013 inch nozzle. The coherent layer formed thereby is simultaneously foamed and cured by heating to 175° C. for 30 minutes, thereby producing a layer of foamed insulation on said substrate.

What is claimed is:

1. A sprayable non aqueous and foamable composition comprising:

(A) at least one polymer selected from the group consisting of ethylene/alphaolefin copolymer, ethylene/alphaolefin/nonconjugated polyene terpolymer, polyacrylate, polymethacrylate, polyisoprene, polyacrylonitrile, polymethacrylonitrile and polybutadiene; said polymer having a number average molecular weight of between about 500 and about 10,000;

(B) an effective amount of organic peroxide curative; and (C) an effective amount of a blowing agent having an activation temperature which less than or about equal to the curing temperature of component (B); said composition possessing a Brookfield viscosity of less than about 100,000 centipoise at shear rates of 5 sec$^{-1}$ or greater.

2. The composition of claim 1 wherein component (A) is selected from the group consisting of ethylene/alphaolefin copolymer and ethylene/alphaolefin/nonconjugated polyene terpolymer.

3. The composition of claim 1 wherein the molecular weight of polymer (A) is between about 1,000 and about 10,000.

4. The composition of claim 3 wherein the molecular weight of polymer (A) is between about 4,000 and about 7,000.

5. The composition of claim 1 wherein component (B) is present in an amount of between about 0.5 and about 5.0 parts by weight per 100 parts by weight of polymer.

6. The composition of claim 1 wherein component (C) is present in an amount of between about 0.1 and about 10 parts by weight per 100 parts by weight of polymer.

7. The composition of claim 1 wherein said composition further comprises a filler.

8. The composition of claim 1 wherein said composition possesses a Brookfield viscosity of less than about 75,000 centipoise at shear rates of 5 sec$^{-1}$ or greater.

9. The composition of claim 1 wherein said composition possesses a Brookfield viscosity of less than about 50,000 centipoise at shear rates of 5 sec$^{-1}$ or greater.

* * * * *